(12) United States Patent
Stout

(10) Patent No.: US 7,080,714 B2
(45) Date of Patent: Jul. 25, 2006

(54) LADDER SECURING DEVICE

(76) Inventor: John Stout, 7041 S. 2700 East, Salt Lake City, UT (US) 84121

( * ) Notice: Subject to any disclaimer, the term of this patent is extended or adjusted under 35 U.S.C. 154(b) by 6 days.

(21) Appl. No.: 10/787,364

(22) Filed: Feb. 26, 2004

(65) Prior Publication Data

US 2005/0189174 A1 Sep. 1, 2005

(51) Int. Cl.
*B60R 9/042* (2006.01)
(52) U.S. Cl. ....................... 182/127; 224/315
(58) Field of Classification Search ............... 182/127; 224/315, 324, 309, 317, 325, 326
See application file for complete search history.

(56) References Cited

U.S. PATENT DOCUMENTS

| | | | | |
|---|---|---|---|---|
| 2,237,853 A | * | 4/1941 | Troche | 182/127 |
| 3,904,094 A | * | 9/1975 | Correll | 224/324 |
| 4,262,834 A | * | 4/1981 | Nutt | 224/324 |
| 5,850,891 A | * | 12/1998 | Olms et al. | 182/127 |
| 6,257,534 B1 | * | 7/2001 | Finley | 248/201 |

FOREIGN PATENT DOCUMENTS

FR 2596343 A1 * 10/1987

* cited by examiner

*Primary Examiner*—Alvin Chin-Shue
(74) *Attorney, Agent, or Firm*—Starkweather & Associates; Michael W. Starkweather; Jason P. Webb

(57) ABSTRACT

A ladder securing device for securing a ladder to a device attached to a vehicle for safe transport and security. The ladder securing device includes at least a first section and a second section. The first section includes a first base piece positioned upon a structure member. The first base piece comprises first and second side pieces whereon an upper piece is coupled to the first side piece. The second section comprises a second base piece and first and second side pieces. The first side piece of the second base piece includes an upper piece secured thereon. The second side piece includes a locking mechanism which may be comprised of both a securing arm and a locking arm, or just a securing arm, wherein the securing arm secures the ladder to the device while the locking arm may be locked to a locking arm receiver for locking the securing arm over the ladder to provide security against movement and theft. The ladder securing device includes a slide prevention device coupled to either the first or second base pieces, or to a securing arm.

5 Claims, 10 Drawing Sheets

LADDER SECURING DEVICE

BACKGROUND OF THE INVENTION

1. The Field of the Invention

This invention relates generally to the field of locking and securing mechanisms, such as those commonly used to secure objects to vehicles, and more specifically to a novel locking and securing mechanism to secure ladders onto construction racks and other types of racks.

2. The Background Art

It is fairly common to see a ladder placed on top of a make-shift ladder holder, on a vehicle, traveling down the freeway, highway, or the road. Likewise, it is not uncommon to see, or hear a report on the radio about a smashed ladder resting on a freeway, highway, or the road due to a quick turn, a bump, or strong wind. Accordingly, there does not currently appear to be a device specifically designed to lock and secure ladders to ladder racks. Presently, ladders are commonly secured to construction racks or other types of racks by means of a rope, a cord, a wire, chains, nylon webbing or other like devices of sufficient strength.

While adequate for some applications, the securing types just described include a number of disadvantages. For example, the securing is only as good as the person doing the securing. While one person may do an adequate job of securing the ladder, the next person may do a wholly inadequate job. If the ladder is not adequately tied down, there is a substantial risk that the ladder will come off the rack while the vehicle is in operation. Additionally, the ultimate security of the ladder on the rack depends on the operator's skill with knots. If the ladder is not adequately tied down, if the knot becomes loose during operation, or if the rack does not have sufficient slide prevention, there is a substantial risk that the ladder will come off the rack while the vehicle is in operation. This creates a substantial risk of delay, injury, death and/or significant property damage.

Another disadvantage of these securing types is that there is no manner to adequately lock the ladder to the rack to prevent theft. The ladder can be stolen by untying, unwinding, or cutting the rope, wire, or cord.

Still another disadvantage of these securing types is that it is difficult and time consuming to apply. This causes substantial inconvenience for the operator and possibly creates a situation where the operator will cut corners in order to save time and the ladder will not be adequately secured to the rack.

A further disadvantage of these securing types is that they can be easily lost or misplaced by the operator. Because the device is not necessarily secured to the rack, it is possible to lose it between uses, thus creating a situation where an operator will not have the means to secure the ladder to the rack.

Still a further disadvantage of these securing types is that, while it is difficult to secure a single ladder, it is even more difficult to secure more than one ladder. Two or more ladders placed on top of one another creates a situation where a ladder is even more likely to come off the rack.

Thus, it can be clearly recognized that there is a need for a simple and efficient device for securing and locking a ladder to a vehicle. There is also a need for a device that provides a certain level of confidence that the ladder will be secured and locked to the vehicle and that securing and locking the ladder will not be a time consuming ordeal.

SUMMARY OF THE INVENTION

The various elements of the present invention have been developed in response to the present state of the art, and in particular, in response to the problems and needs in the art that have not yet been fully solved by currently available devices for securing and locking ladders to vehicles. Accordingly, the present invention provides a device for securing and locking a ladder to a vehicle that decreases the amount of securing time and that ensures a higher level of confidence that the ladder will remain secured and locked to the device.

More particularly, the present invention provides a series of side, upper, and base pieces for cradling the ladder, and a locking mechanism for locking the ladder to a securing device.

Therefore, a feature of the present invention is to provide a locking mechanism that can lock the ladder into place to prevent theft of the ladder.

Similarly, another feature of the present invention is to provide a locking mechanism that can secure a ladder and lock the ladder into place to prevent the ladder from falling loose and causing injury or damage.

An additional feature of the present invention is to provide a locking mechanism that does not come loose when it is not in use and cannot, therefore, be misplaced by the operator.

A further important feature of the invention is to have a securing device that locks and secures more than one ladder, or different sized ladders, in place at a time.

Additional features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE ILLUSTRATED EMBODIMENT(S)

Figure 1:
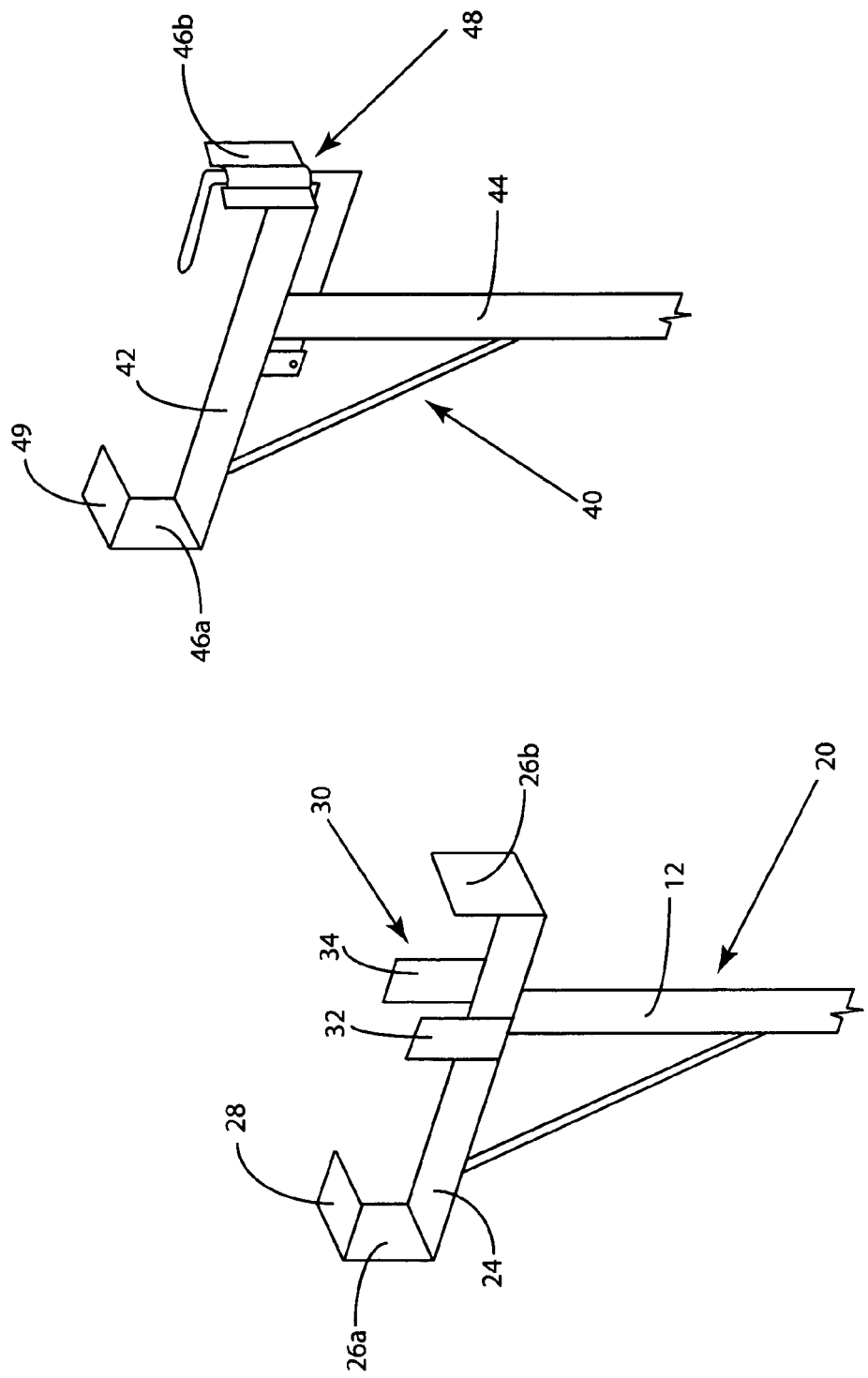
FIG. 1 is a perspective view of one embodiment, illustrating the ladder securing device.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

FIG. 1 illustrates one embodiment of the ladder securing device, or system 10. Specifically, the ladder securing device 10 includes at least two sections, a first section 20 and a second section 40. The first section 20 includes a first base piece 24 secured to a first structure member 12. First and second side pieces 26a, 26b are secured to the first base piece 24. In this embodiment, a first upper piece 28 is secured to the first side piece 26a.

Additionally, this embodiment includes a slide prevention device 30 coupled to the first base 24. The slide prevention device 30 comprises two pieces, a first slide piece 32, and a second slide piece 34, secured to the first base piece 24 of the first section 20. An optional support member 36 provides structural support and strength to the first base piece 24.

The second section 40 of the ladder securing device 10 comprises a second base piece 42 secured to a second structure member 44. Fixed upon the second base piece 42 are first and second side pieces 46a and 46b. A second upper piece 49 is secured to a top edge of the first side piece 46a. In this embodiment, the second side piece 46b supports a swivel-type locking mechanism 48.

Figure 2:
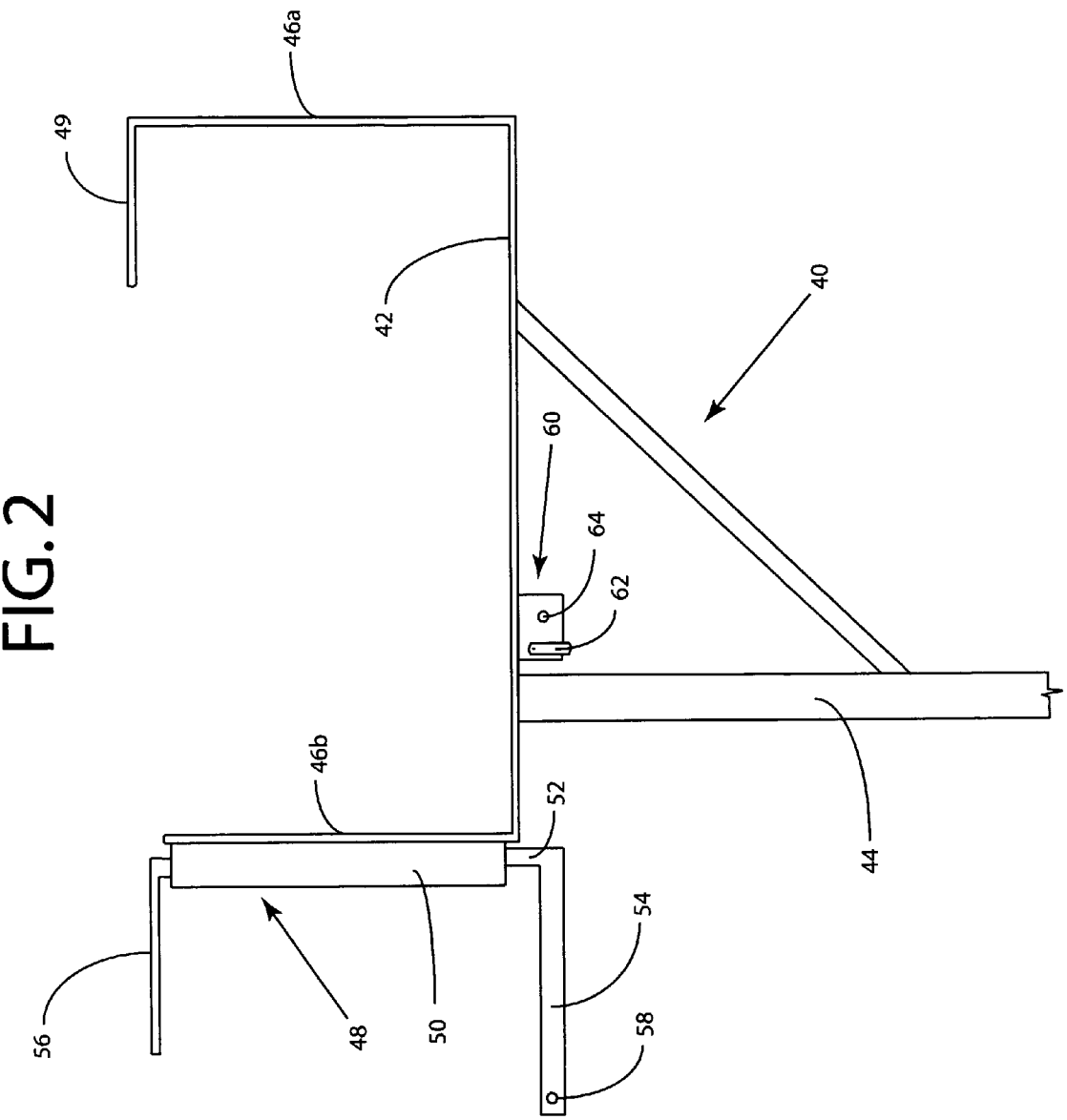
FIG. 2 is a side view illustrating the embodiment of FIG. 1.

FIG. 2 illustrates a rear view of the embodiment of FIG. 1. Positioned to the outside of the second side piece 46b is the locking mechanism 48. The locking mechanism 48 comprises a holding piece 50 for rotationally securing a swivel piece 52. The swivel piece 52 is slightly longer than the second side piece 46b to permit rotational movement. A locking arm 54 is attached to a lower end of the swivel piece 52, and a securing arm 56 attached at an upper end of the swivel piece 52. In this embodiment, both the locking arm 54 and the securing arm 56 are substantially perpendicularly secured to the swivel piece 52, and each are substantially radially aligned with each other. The locking arm 54 includes a hole 58. When the locking arm 54 is rotated inwardly, the securing arm 56 also rotates inwardly.

Secured to a bottom of the second base piece 42 is a locking arm receiver 60, which is configured to communicate with the locking arm 54. The locking arm receiver 60 includes a latch 62 and a hole 64, corresponding to the hole 58 of the locking arm 54. In this embodiment, both the locking arm hole 58 and the locking arm receiver hole 64 are configured to receive a lock.

Figure 3:
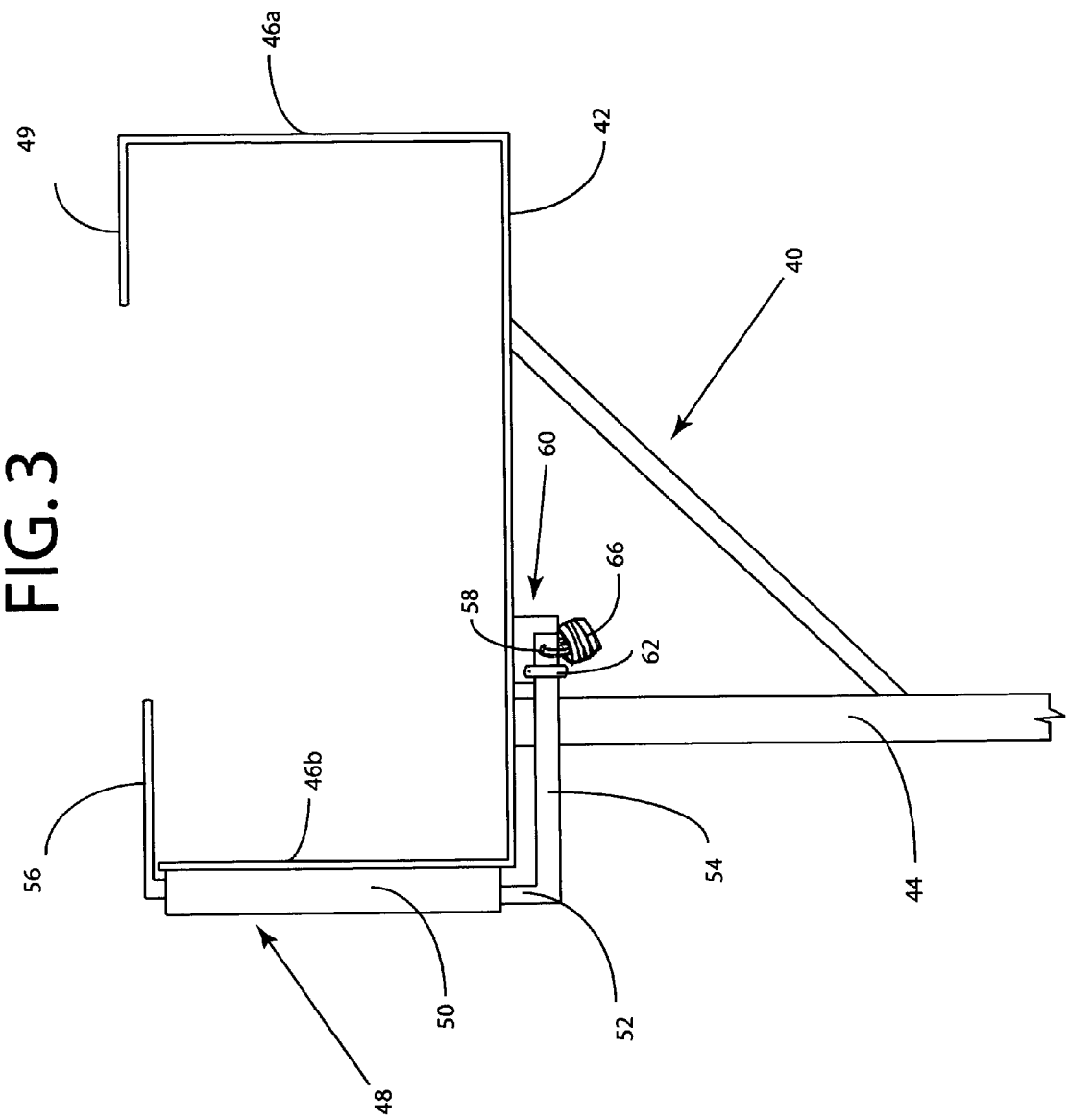
FIG. 3 is a back view illustrating an embodiment of the locking mechanism in a closed and locked position from FIG. 2.

The embodiment of FIG. 3 illustrates the locking arm 54 coupled to the locking arm receiver 60, and the securing arm 54 all positioned to secure the ladder to the securing device 10. In situations when a lock has not been used to couple the locking arm to the locking arm receiver, the latch 62 is configured to prevent reverse rotational movement of the locking mechanism 48. However, in this embodiment, a lock 66 passes through the corresponding holes 58 and 64 to immobilize the locking arm 54.

Figure 4:
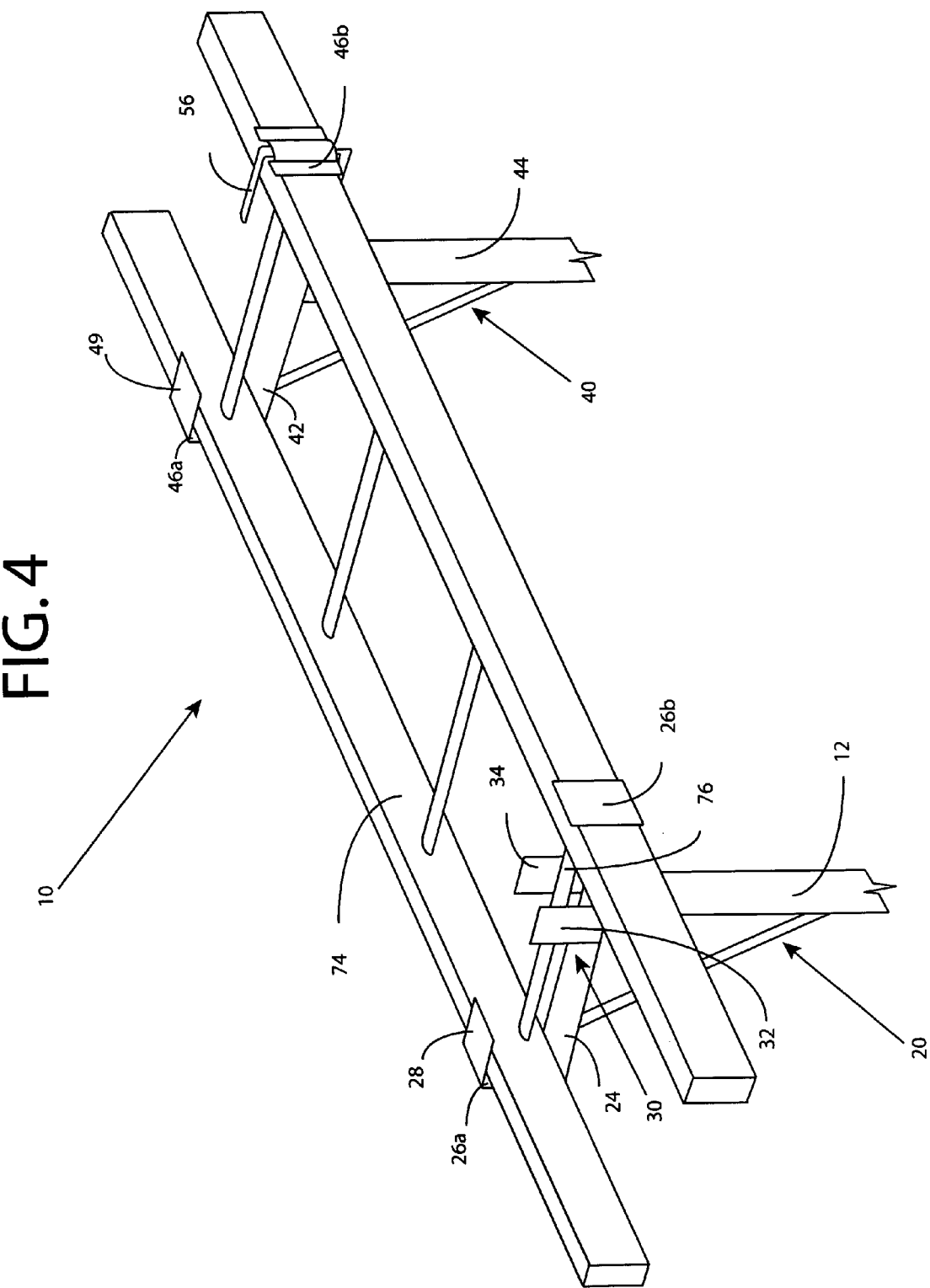
FIG. 4 is a top perspective view illustrating the securing arm securing the ladder to the securing device of FIG. 1.

FIG. 4 illustrates another embodiment of the securing device 10. In this embodiment, a ladder 74 is secured to the ladder securing device 10. The first and second slide pieces 32 and 34 of the slide prevention device 30 cradle a rung 76 of the ladder 74 to prevent longitudinal sliding movement of the ladder 74. The first and second top pieces 28 and 48, as well as the securing arm 56, restrain the ladder 74 and prevent vertical movement. First and second side members 26a and 26b, of the first base piece 24, and first and second side pieces 46a and 46b, of the second base piece, prevent lateral movement of the ladder 74. Effectively, the ladder securing device 10 prevents the ladder 74 from significant vertical, lateral, and longitudinal movement.

Figure 5:
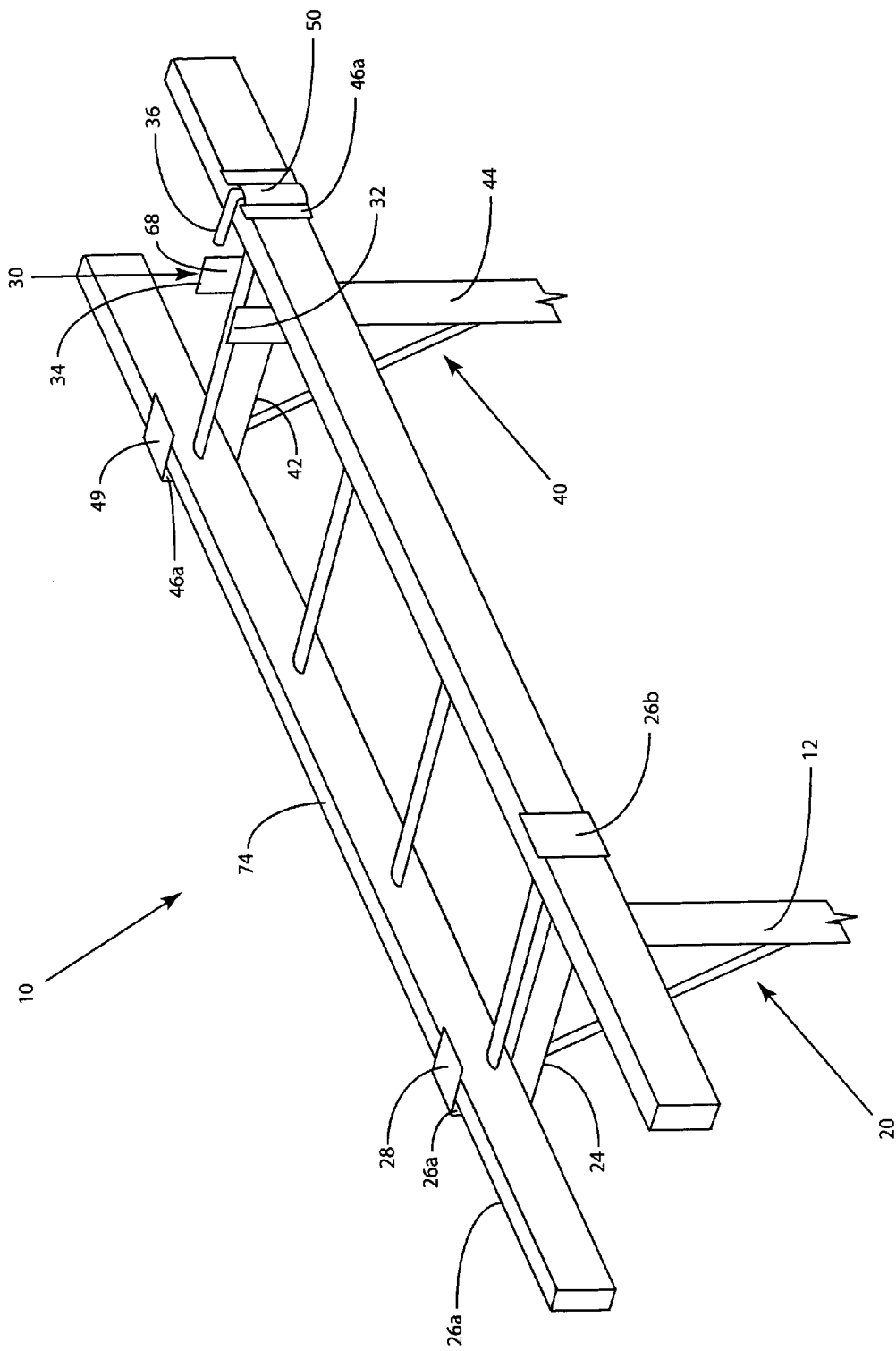
FIG. 5 is a perspective view of another embodiment of the ladder securing device illustrating the slide-prevention device and the locking mechanism on the second base.
Figure 6:
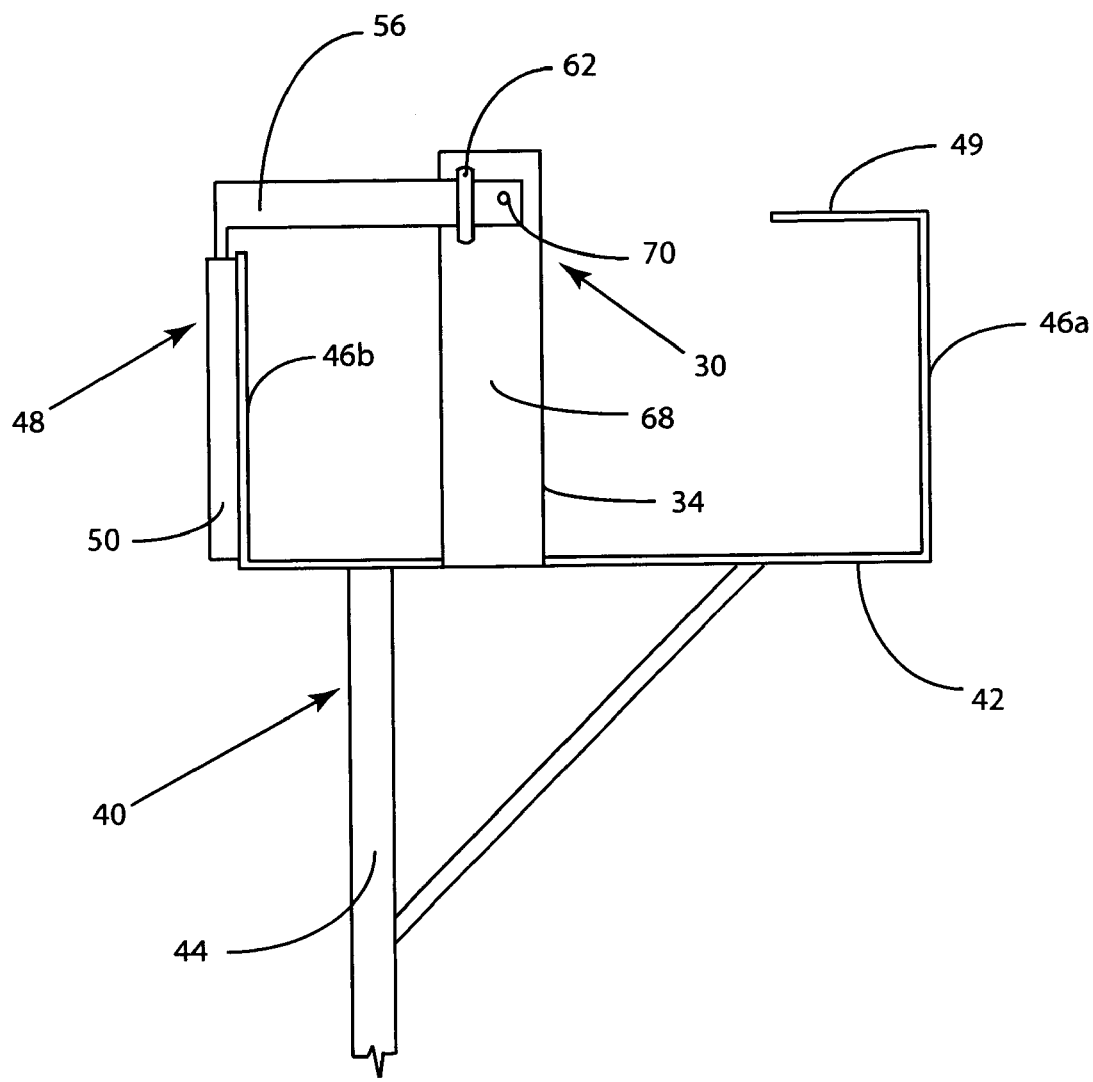
FIG. 6 is a back view illustrating the another embodiment of the ladder securing device with a modified locking mechanism.
Figure 7:
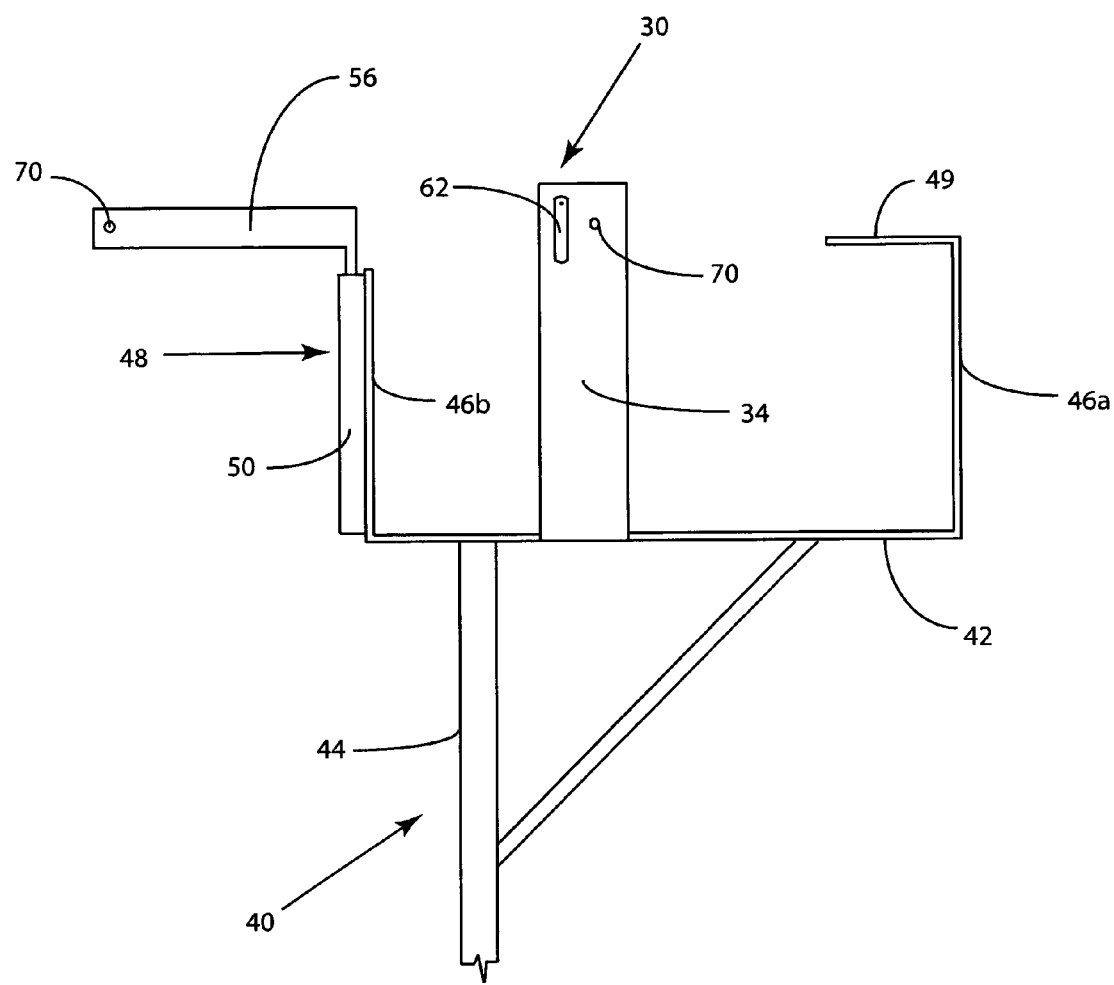
FIG. 7 is a back view of an embodiment illustrating the modified locking mechanism in the open position.

FIGS. 5, 6, and 7 illustrate another embodiment of the current invention wherein the second section 40, comprises the slide prevention device 30. In this embodiment, the first slide piece 32 and second slide piece 34 of the slide prevention device 30 may be secured to the second base piece 42. In addition, rather than having an independent locking arm, as discussed in other embodiments, this particular embodiment incorporates the attributes of the locking arm 54 and the securing arm 56 into one piece. Specifically, the securing arm 56 accomplishes the dual task of securing the ladder 74 to the securing device 10 as well as serving as a looking arm 54. This is accomplished by providing a hole 70 at the distal end of the securing arm 56, corresponding to the hole 68 in the second slide piece 34 of the slide prevention device 30. The slide prevention device 30 may include a latch 62 to secure the securing arm 56. The first and second base pieces 20 and 40 include first and second side members 26a and 46a, respectively, extending substantially perpendicularly from the first and second base pieces 20 and 40. First and second upper members, or top members, 28 and 49 extend from each of the side members 26a and 46a, respectively, and also extend inwardly, thereby being configured to prevent movement of an enclosed object away from the first and second base pieces 20 and 40.

Figure 8:
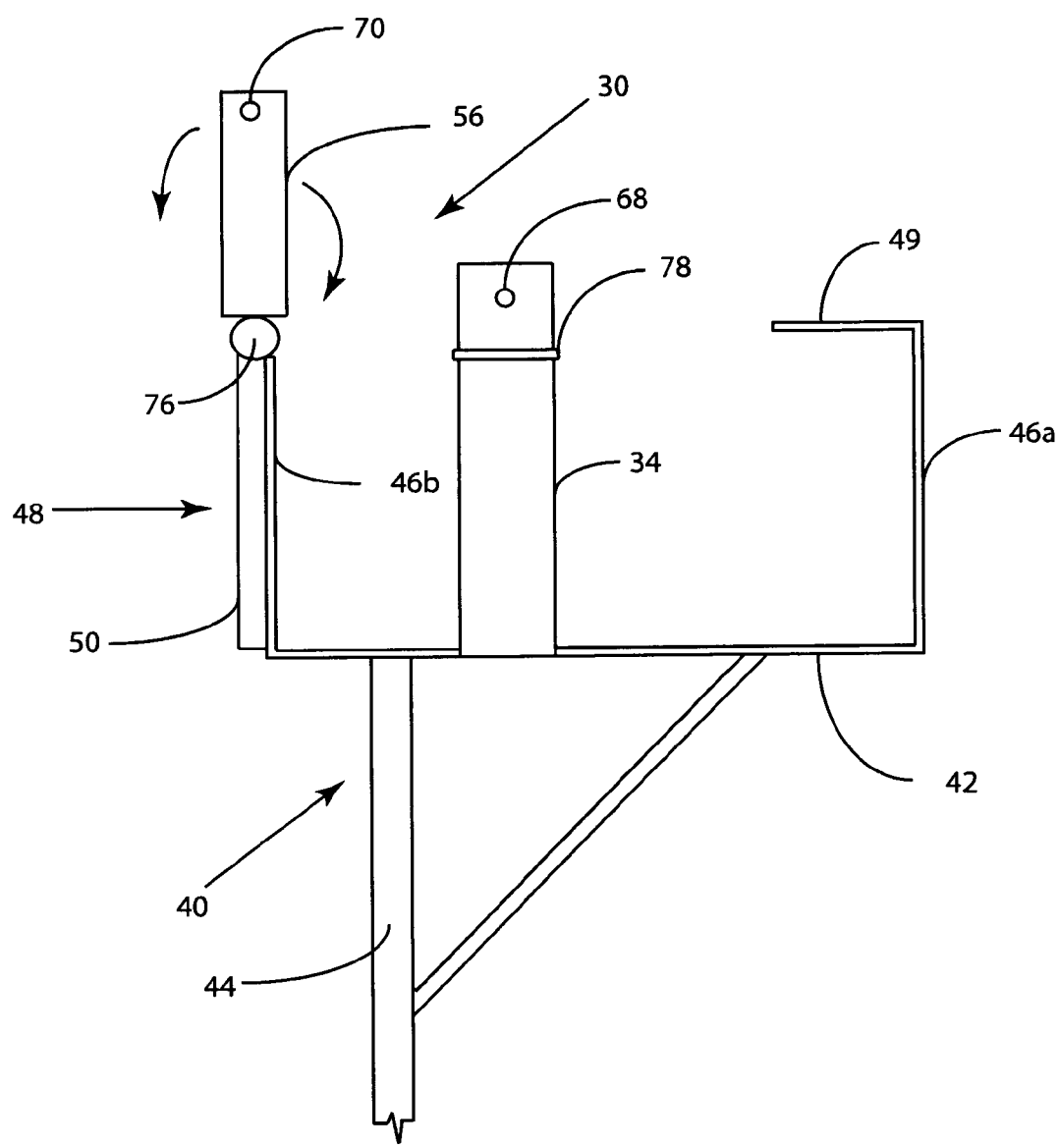
FIG. 8 is back view of another embodiment illustrating a hinged locking mechanism.

FIG. 8 illustrates another embodiment of the invention wherein the locking mechanism 48 utilizes a hinge 76 coupled to the securing arm 56. The securing arm 56 rotates about the width of the side member 46b, over the top of the ladder 74, and rests on a ridge 78. A hole 70 in the securing arm 56 is configured to correspond with a hole 68 in the slide prevention device 30.

Figure 9:
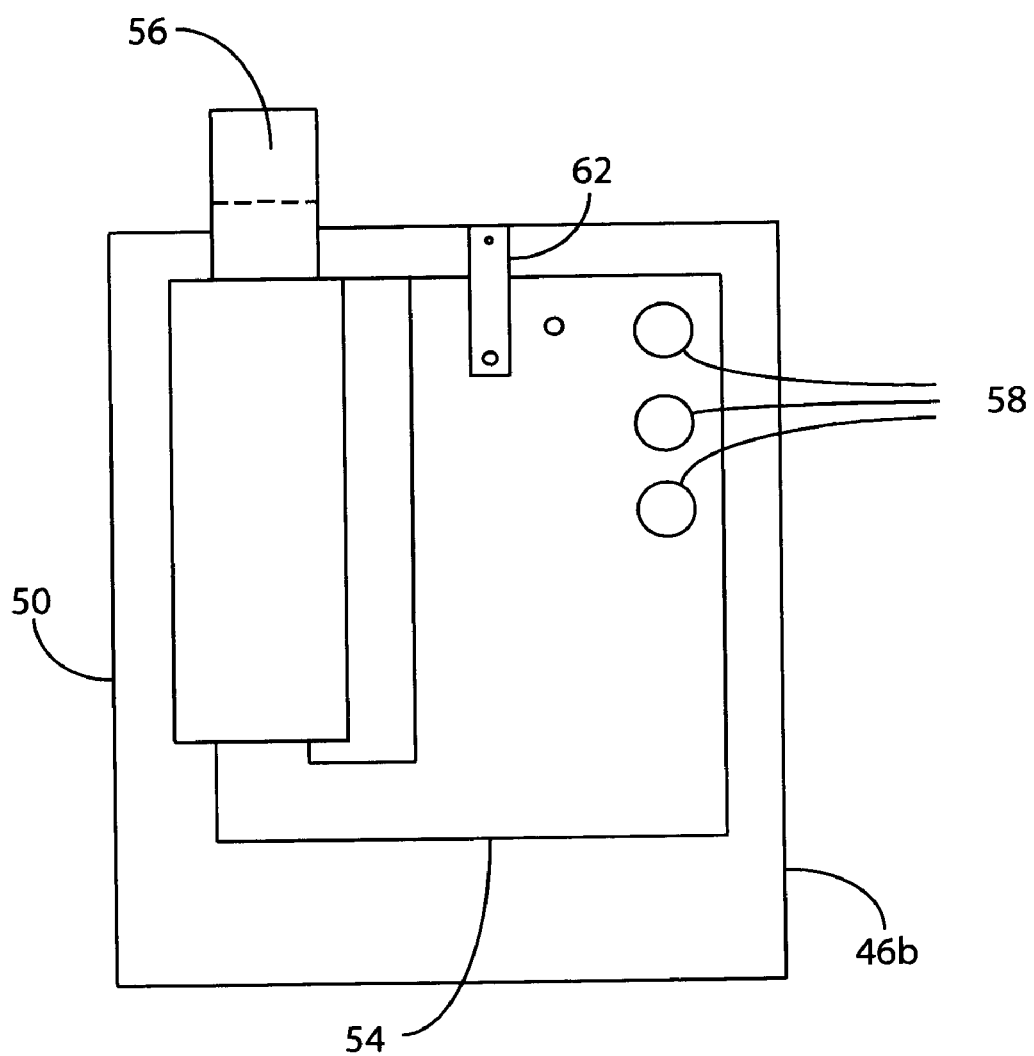
FIG. 9 is a side view of another embodiment of the locking mechanism in accordance with the present invention.
Figure 10:
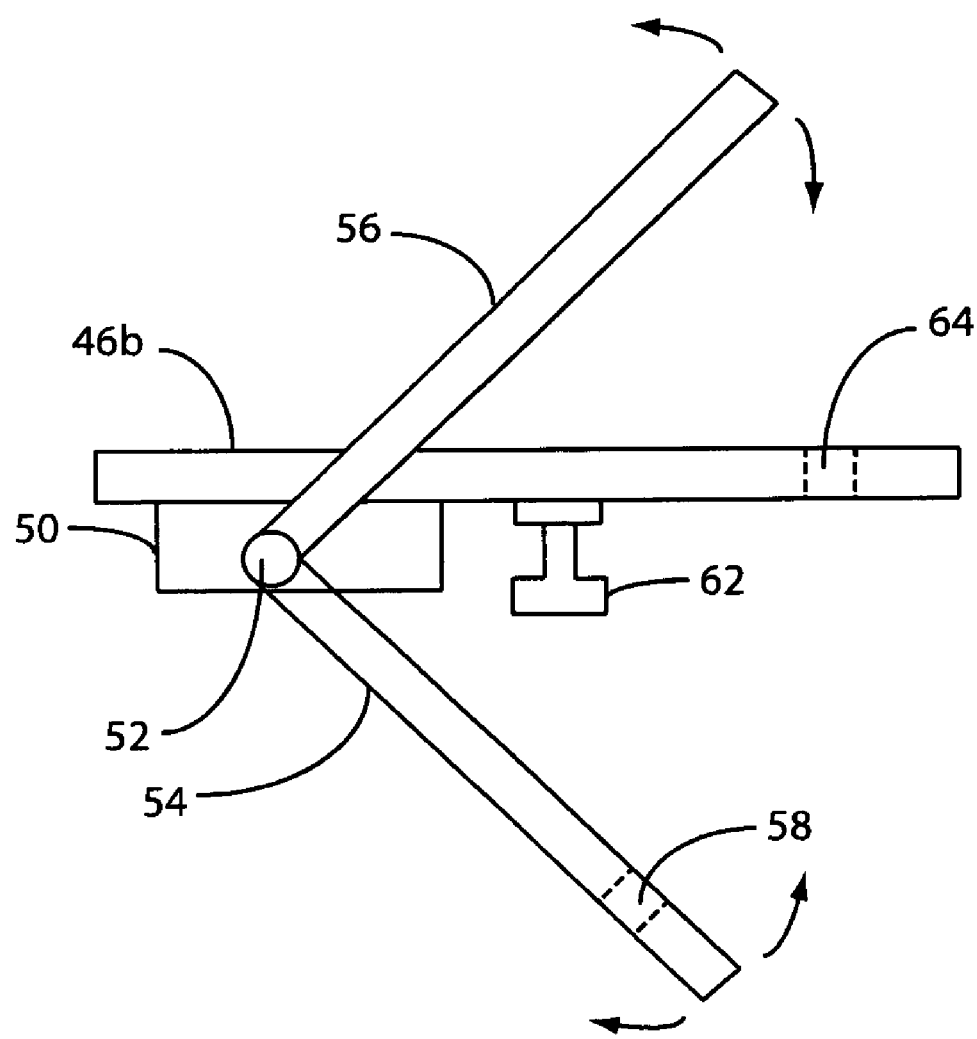
FIG. 10 is top view illustrating the embodiment shown in FIG. 9.

FIGS. 9 and 10 illustrate another embodiment of the invention wherein the locking mechanism comprises a locking arm 54, which is designed to communicate with the side member 46b. The locking arm 54 includes holes 58, which communicate with holes in the side member 46b and are designed to receive a lock. The locking arm 54 is integrally attached to a securing arm 56 which is designed to secure the ladder to the securing device 10.

It is understood that the above-described arrangements are only illustrative of the application of the principles of the present illustrated embodiments. Numerous modifications and alternative arrangements may be devised by those skilled in the art without departing from the spirit and scope of the present invention and the appended claims are intended to cover such modifications and arrangements.

In addition, although one embodiment describes a slide prevention device 30 on the first section 20, it is envisioned that the slide prevention device 30 may be comprised of the first slide piece 32 of the slide prevention device 30 on the first section 20, and the second slide piece 34 of the slide prevention device 30 on the second section 40. Likewise, it is envisioned that the slide prevention device 30 may be comprised of the second slide piece 34 of the slide prevention device 30 on the first section 20 and the first slide piece 32 of the slide prevention device on the second section 40.

Although the embodiments illustrate that the alternative locking mechanism 48 is positioned as illustrated in FIG. 8, other variations are contemplated. For example, the locking mechanism 48 could have one or both of the first and second side pieces 32 and 34 solidly connected to the securing arm 56, and not attached to the base 42. Thus, a ladder 74 would be placed on the base 42 and the securing arm 56 and first and second slide pieces 32 and 34 would be fitted over the rung of the ladder 74.

In addition, although an embodiment describes, and a figure illustrates, a padlock 46 to lock the locking arm 54 in a closed position, it is envisioned that any kind of locking device can be used. For example, an integrated lock on the end of the locking arm 54, or a post attached to the locking arm receiver 60, which passes through the locking arm 54, having a lateral hole wherein a lock may be positioned through the hole to secure the locking arm 54 with the locking arm receiver 60.

Furthermore, other arrangements of the side pieces 26, 46 are envisioned. Particularly, as one example, it is envisioned that the side pieces 26, 46 are secured to the top of the base pieces 24, 42, recessed from the edges, rather than being secured to the ends of the base pieces 24, 42, and that the upper pieces 28, 49 are configured to point outwardly from the securing device, rather than inwardly. Likewise, in another example, it is envisioned that the side pieces, 26 and 46, are angled, rather than perpendicular, as well as the upper pieces 28, 49.

Additionally, it is also envisioned that, for example, the securing arm 56 be extended to reach to any distance across the base piece 24, 42 to communicate with a slide prevention device 30 or a side piece 26,46, or to an upper piece 28,49.

Additionally, it is also envisioned that the first and second structure members may not be needed for the ladder securing device 10. For example, it is envisioned that the base pieces 24 and 42 are directly secured to a top of a vehicle.

Finally, although the illustrations show flat square plates being used for the various elements, it is anticipated that any shape of device may be used.

While the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A securing device designed to removably secure a ladder to a vehicle, comprising:
    a first and second base piece, each having a first and second side member extending substantially perpendicularly from an end of the first and second base piece respectively and each side member configured to prevent lateral movement of an object to be mounted on the first and the second base pieces;
    a first and second upper member coupled to each of the first side members and extending therefrom substantially perpendicularly and inwardly, configured to prevent movement of the object away from the first and second bases;
    a slide prevention device mounted to either the first or second bases, and configured to prevent sliding movement of the object across the first and second bases; and
    a securing arm, rotatably connected to a second side member of either the first or second bases, configured to rotate over the object, and configured to prevent vertical movement of the object,
    wherein the slide prevention device comprises a hole, corresponding to a hole on the securing arm, and removably receiving a locking device in the holes.

2. The securing device of claim 1, wherein the slide prevention device comprises a securing arm receiving area, configured to communicate with the securing arm.

3. The securing device of claim 1, wherein the slide prevention device is mounted to the second base and the securing arm is coupled to the second side member of the second base.

4. The securing device of claim 1, wherein the slide prevention device is mounted to the first base and the securing arm is coupled to the second side member of the first base.

5. The ladder securing device of claim 1, wherein the slide prevention device comprises a first member and a second member, each member being secured to a base member, configured to position a ladder rung between the first member and the second member.

* * * * *